United States Patent
Chee et al.

(10) Patent No.: US 9,065,542 B2
(45) Date of Patent: Jun. 23, 2015

(54) RADIO FREQUENCY FRONT END SYSTEM WITH AN INTEGRATED TRANSMIT/RECEIVE SWITCH

(75) Inventors: Yuen Hui Chee, Redwood City, CA (US); Albert Chia-Wen Jerng, Los Gatos, CA (US)

(73) Assignee: RALINK TECHNOLOGY CORPORATION, Jhubei (TW)

( * ) Notice: Subject to any disclaimer, the term of this patent is extended or adjusted under 35 U.S.C. 154(b) by 639 days.

(21) Appl. No.: 13/204,544

(22) Filed: Aug. 5, 2011

(65) Prior Publication Data

US 2013/0035048 A1 Feb. 7, 2013

(51) Int. Cl.
*H04B 1/44* (2006.01)
*H04B 1/525* (2015.01)
*H01Q 1/50* (2006.01)
*H01Q 3/24* (2006.01)

(52) U.S. Cl.
CPC ........... *H04B 1/525* (2013.01); *Y10T 29/49018* (2015.01)

(58) Field of Classification Search
CPC .......... H04B 1/18; H04B 1/0458; H04B 1/48; H04B 1/44; H04B 1/38; H01Q 1/50; H01Q 3/24

USPC .......... 455/73, 78, 83; 343/860, 876
See application file for complete search history.

(56) References Cited

U.S. PATENT DOCUMENTS

| | | | |
|---|---|---|---|
| 7,266,360 B2 * | 9/2007 | Kang et al. ..................... 455/302 |
| 2005/0088242 A1 * | 4/2005 | Behzad .......................... 330/311 |
| 2007/0207746 A1 * | 9/2007 | Huang et al. .................... 455/78 |
| 2008/0057883 A1 * | 3/2008 | Pan .............................. 455/127.1 |
| 2008/0299913 A1 * | 12/2008 | Han et al. ........................ 455/83 |
| 2009/0289721 A1 * | 11/2009 | Rajendran et al. ............. 330/301 |
| 2010/0035563 A1 * | 2/2010 | Mikhemar et al. .............. 455/78 |
| 2010/0203846 A1 * | 8/2010 | Gorbachov ..................... 455/83 |
| 2010/0237942 A1 * | 9/2010 | Li et al. .......................... 330/253 |
| 2010/0321113 A1 * | 12/2010 | Kathiresan et al. ........... 330/278 |
| 2011/0273355 A1 * | 11/2011 | Ahn et al. ...................... 343/860 |
| 2011/0299437 A1 * | 12/2011 | Mikhemar et al. ............ 370/278 |

\* cited by examiner

*Primary Examiner* — Ayodeji Ayotunde (74) *Attorney, Agent, or Firm* — Sawyer Law Group, P.C.

(57) ABSTRACT

A Radio Frequency (RF) front end system and method are disclosed. The RF front end system comprises an antenna, a matching network coupled to the antenna, a power amplifier (PA) coupled to the matching network via a port on a transmit path, a low noise amplifier (LNA) coupled to the matching network via the port on a receive path and at least one transmit/receive switch (T/R SW) coupled between the port and at least one of the PA and LNA.

21 Claims, 9 Drawing Sheets

Prior Art

RADIO FREQUENCY FRONT END SYSTEM WITH AN INTEGRATED TRANSMIT/RECEIVE SWITCH

FIELD OF THE INVENTION

The present invention relates to a Radio Frequency (RF) front end system, and more particularly, to a RF front end system utilized in a transceiver system.

BACKGROUND

Some conventional transceivers do not isolate transmitters from receivers to allow for independent optimization of the transmitters and receivers. Other conventional transceivers integrate Radio Frequency (RF) front end components off-chip to isolate transmitters from receivers which increases the cost and size of the RF front end systems. Accordingly, what is desired is to provide a system and method that overcomes the above issues. The present invention addresses such a need.

SUMMARY OF THE INVENTION

A Radio Frequency (RF) front end system and method are disclosed. The RE front end system comprises an antenna, a matching network coupled to the antenna, a power amplifier (PA) coupled to the matching network via a port on a transmit path, a low noise amplifier (LNA) coupled to the matching network via the port on a receive path and at least one transmit/receive switch (T/R SW) coupled between the port and at least one of the PA and LNA.

BRIEF DESCRIPTION OF THE DRAWINGS

The accompanying drawings illustrate several embodiments of the invention and, together with the description, serve to explain the principles of the invention. One of ordinary skill in the art will recognize that the particular embodiments illustrated in the drawings are merely exemplary, and are not intended to limit the scope of the present invention.

DETAILED DESCRIPTION OF PREFERRED EMBODIMENTS

The present invention relates to a Radio Frequency (RF) front end system, and more particularly, to a RF front end system utilized in a transceiver system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

A Radio Frequency (RF) front end system and method are disclosed. The RF front end system comprises an antenna, a matching network coupled to the antenna, a power amplifier (PA) coupled to the matching network via a port on a transmit path, a low noise amplifier (LNA) coupled to the matching network via the port on a receive path and at least one transmit/receive switch (T/R SW) coupled between the port and at east one of the PA and LNA. In so doing, a more robust integrated T/R SW solution is achieved and the cost, size and package pin count of the RF front end is further reduced. To describe the features of the present invention in more detail, refer now to the following description in conjunction with the accompanying Figures.

Figure 1:
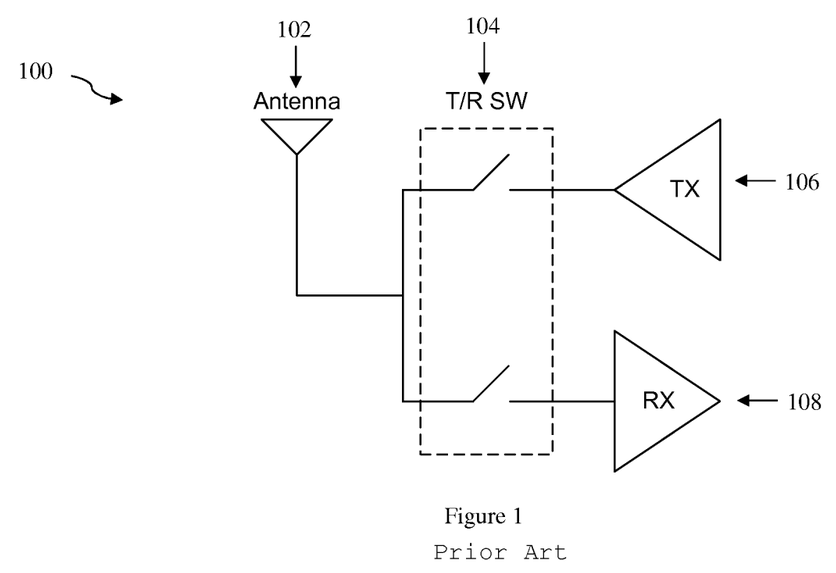
FIG. 1 illustrates a conventional time division duplexing (TDD) transceiver front end system.

In a conventional time division duplexing (TDD) transceiver front end system, a T/R SW is used to share the antenna between a transmitter and receiver. FIG. 1 illustrates a conventional TDD transceiver front end system 100 that includes an antenna 102, a T/R SW 104, a transmitter (TX) 106, and a receiver (RX) 108. However, in this conventional TDD transceiver front end system 100, the transmitter 106 and the receiver 108 may not be optimized with the antenna impedance.

Figure 2:
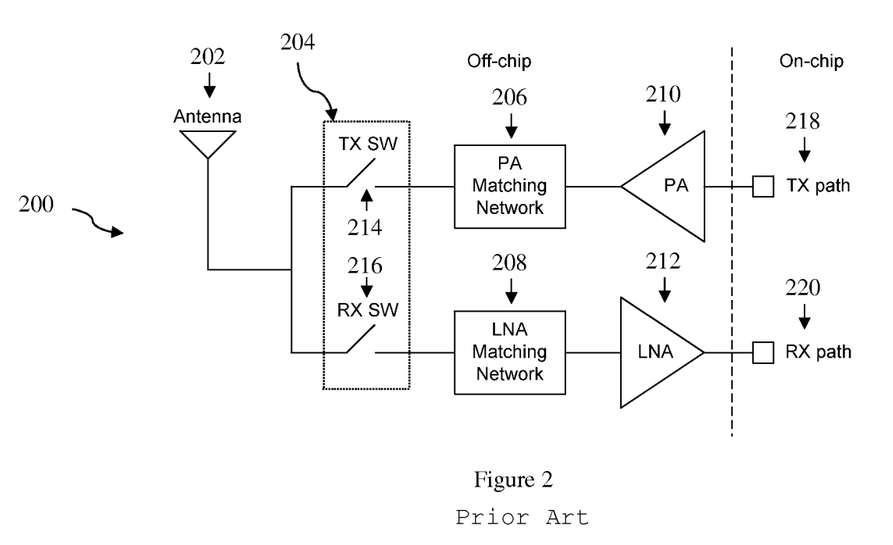
FIG. 2 illustrates an existing transmit/receive switch (T/R SW) implementation.

To address this problem, FIG. 2 illustrates an existing transceiver front end system 200 that includes an antenna 202, a T/R SW 204, a PA matching network 206, a LNA matching network 208, a power amplifier (PA) 210 and a low noise amplifier (LNA) 212 that are all integrated as off-chip components. During receive, the transmit switch (TX SW) 214 is open and the receive switch (RX SW) 216 is closed which connects the antenna 202 to the receive path (RX path) 220 and isolates the transmit path (TX path) 218 from the RX path 220. During transmit, the TX SW 214 is closed and the RX SW 216 is open which connects the antenna 202 to the TX path 218 and isolates the RX 220 path from the TX path 218.

Thus, in this transceiver front end system 200, the T/R SW 204 allows the antenna 202 to be shared between the TX path 218 and RX path 220 while providing isolation between them. With the TX path 218 isolated from the RX path 220, the PA matching network 206 and the LNA matching network 208 can each be optimized independently for the PA 210 and the LNA 212 respectively. However, in this transceiver front end system 200, the RF front end components, including the T/R SW 204, PA 210 and LNA 212, are integrated off-chip which increases the cost and size of the RF front end.

Figure 3:
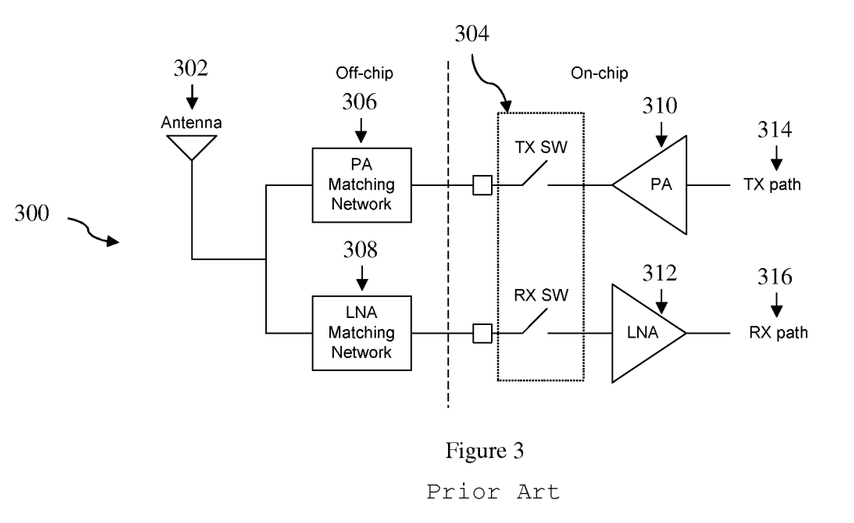
FIG. 3 illustrates another existing T/R SW implementation.

To address this problem and reduce the cost and size of the RF front end, FIG. 3 illustrates another existing transceiver front end system 300 that includes an antenna 302, a T/R SW 304, a PA matching network 306, a LNA matching network 308, a PA 310, a LNA 312, a TX path 314 and a RX path 316. In this transceiver front end system 300, the RF front end components, including the T/R SW 304, PA 310 and LNA 312, are integrated on-chip. In this transceiver front end system 300, the PA 310 and the LNA 312 have their own matching networks 306 and 308 that interact with each other. The PA 310 and its matching network 306 loads the RX path 316 during receive and the LNA 312 and its matching network 308 loads the TX path 314 during transmit. However, in this transceiver front end system 300, it is difficult to achieve a robust matching network that is optimized for both the PA 310 and the LNA 312 without significant performance degradation.

Figure 4:
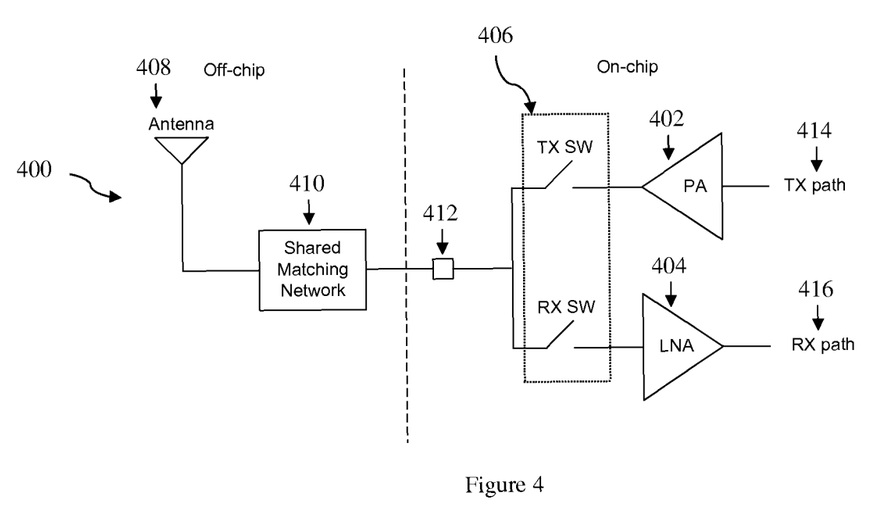
FIG. 4 illustrates a proposed T/R SW implementation in accordance with an embodiment.

The present invention addresses these drawbacks. FIG. 4 illustrates a transceiver front end system 400 that includes a PA 402, LNA 404 and T/R SW 406 integrated on-chip and an antenna 408 and matching network 410 integrated off-chip. In the transceiver front end system 400, the PA 402 and LNA 404 are combined together at a port 412 and share the same matching network 410. In order to share the same matching network 410 and package pin, the PA 402 and LNA 404 are designed with similar optimal impedance. In another embodiment, the port 412 is a single RF port. In the transceiver front end system 400, the T/R SW 406 isolates the TX path 414 from the RX path 416 to minimize the loading on each other.

Figure 5:
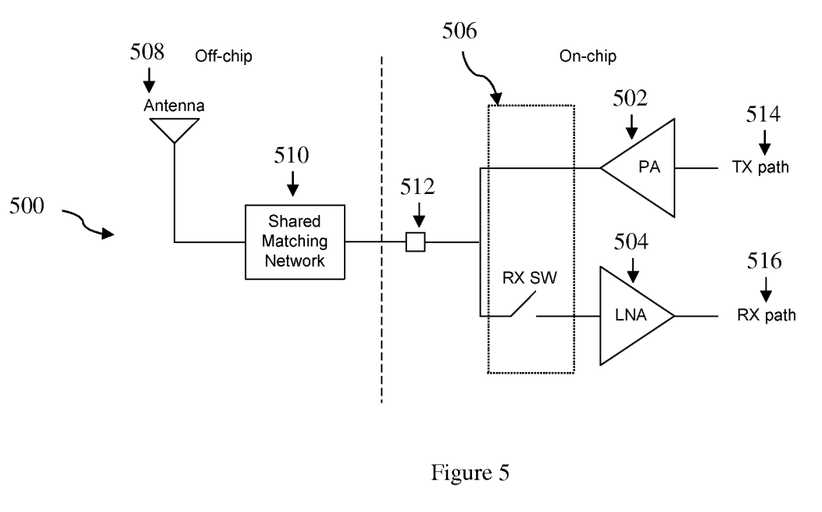
FIG. 5 illustrates a proposed T/R SW implementation with a TX SW integrated with an output stage of the PA in accordance with an embodiment.

It is understood that the transceiver front end system 400 may result in switch loss in the TX path 414. FIG. 5 illustrates another transceiver front end system 500 that includes a PA 502, LNA 504 and T/R SW 506 integrated on-chip and an antenna 508 and matching networking 510 integrated off-chip. In the transceiver front end system 500, the PA 502 and LNA 504 are combined together at a port 512 and share the same matching network 510. In order to share the same matching network 510 and package pin, the PA 502 and LNA 504 are designed with similar optimal impedance. In another embodiment, the port 512 is a single RF port. In the transceiver front end system 500, the switch loss in the TX path 514 is eliminated by integrating the TX SW with the output stage of the PA 502.

Figure 6:
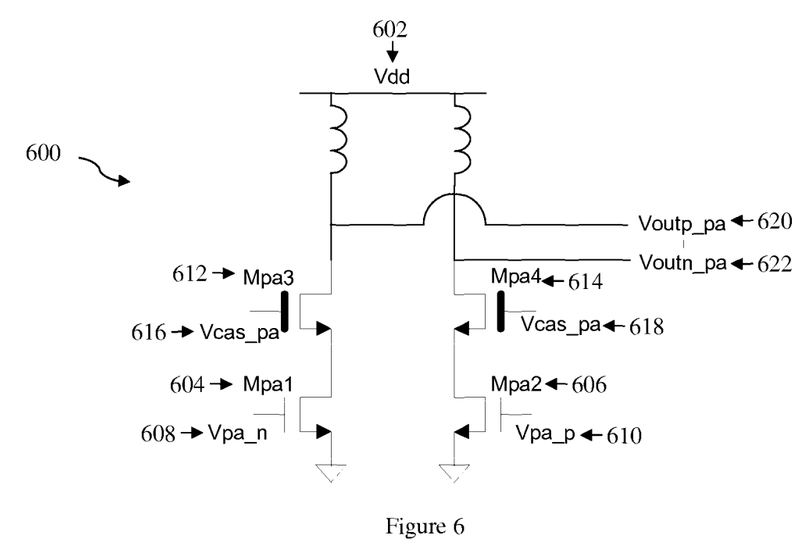
FIG. 6 illustrates an output stage of the PA in accordance with an embodiment.

FIG. 6 illustrates one implementation of such output stage of the PA 600. The output stage of the PA 600 includes an integrated circuit (IC) power supply pin Vdd 602, input devices Mpa1 604 and Mpa2 606, voltages Vpa_n 608 and Vpa_p 610 corresponding to the input devices Mpa1 604 and Mpa2 606, cascode devices Mpa3 612 and Mpa4 614, voltages Vcas_pa 616 and Vcas_pa 618 corresponding to the cascode devices Mpa3 612 and Mpa4 614, and differential output signals Voutp_pa 620 and Voutn_pa 622.

In the output stage of the PA 600, the IC power supply pin Vdd 602 is differentially coupled to the input devices Mpa1 604 and Mpa2 606 and to the cascode devices Mpa3 612 and Mpa4 614. In the output stage of the PA 600, input device Mpa1 604 is in series with cascode device Mpa3 612 and input device Mpa2 606 is in series with cascode device Mpa4 614. Furthermore, input device Mpa1 604 and cascode device Mpa3 612 provide differential output signal Voutn_pa 622 and input device Mpa2 606 and cascode device Mpa4 614 provide differential output signal Voutp_pa 620.

The input devices Mpa1 604 and Mpa2 606 can be made of a variety of materials including but not limited to thin oxide devices to provide a large transconductance. The cascode devices Mpa3 612 and Mpa4 614 can also be made of a variety of materials including but not limited to thick oxide devices to provide isolation between the input and output and prevent device breakdown due to the large output swing. The cascode devices Mpa3 612 and Mpa4 614 also function as the TX SW to isolate the TX path from the RX path when Vcas_pa is pulled low. The output stage of the PA 600 illustrates a differential version of the PA. In another embodiment, the output stage of the PA 600 can be applied to a single-ended version of the PA.

As previously mentioned, the PA and LNA in FIGS. 4 and 5 are designed with similar optimal impedance to allow the PA and LNA to share the same matching network. However, a common source inductive degenerated LNA typically has a much higher optimal impedance than the optimal impedance of a PA. Thus, in one embodiment, the present invention utilizes a common-gate LNA because the common-gate LNA has a similar optimal impedance as the PA.

Figure 7:
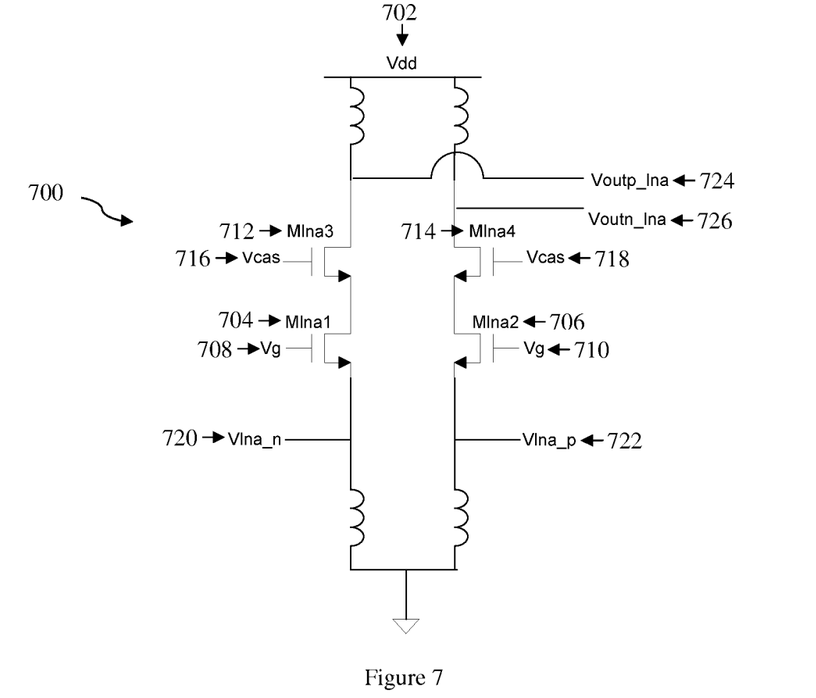
FIG. 7 illustrates a common-gate LNA in accordance with an embodiment.

FIG. 7 illustrates a common-gate LNA 700 that includes an IC power supply pin Vdd 702, input devices MIna1 704 and MIna2 706, voltages Vg 708 and Vg 710 corresponding to the input devices MIna1 704 and MIna2 706, cascode devices MIna3 712 and MIna4 714, voltages Vcas 716 and Vcas 718 corresponding to the cascode devices MIna3 712 and MIna 714, input signals VIna_n 720 and VIna_p 722, and differential output signals Voutp_Ina 724 and Voutn_Ina 726.

In the common-gate LNA 700, the IC power supply pin Vdd 702 is differentially coupled to the input devices MIna1 704 and MIna2 706 and to the cascode devices MIna3 712 and MIan4 714. In the common-gate LNA 700, input device MIna1 704 is in series with cascode device MIna3 712 and input device MIna2 706 is in series with cascode device MIna4 714. Furthermore, input device MIna1 704 and cascade device MIna3 712 provide differential output signal Voutn_Ina 726 and input device MIna2 706 and cascode device MIna4 714 provide differential output signal Voutp_Ina 724.

In the common-gate LNA 700, the input impedance is inversely proportional to the transconductance of the input devices MIna1 704 and MIna2 706. The transconductance of the input devices MIna1 704 and MIna2 706 can be set to a variety of settings including but not limited to a common RF port impedance. Additionally, the cascode devices MIna3 712 and MIna4 714 are used to isolate the input from the output. The common-gate LNA 700 illustrates a differential version of the LNA. In another embodiment, the common-gate LNA 700 can be applied to a single-ended version of the LNA.

Figure 8:
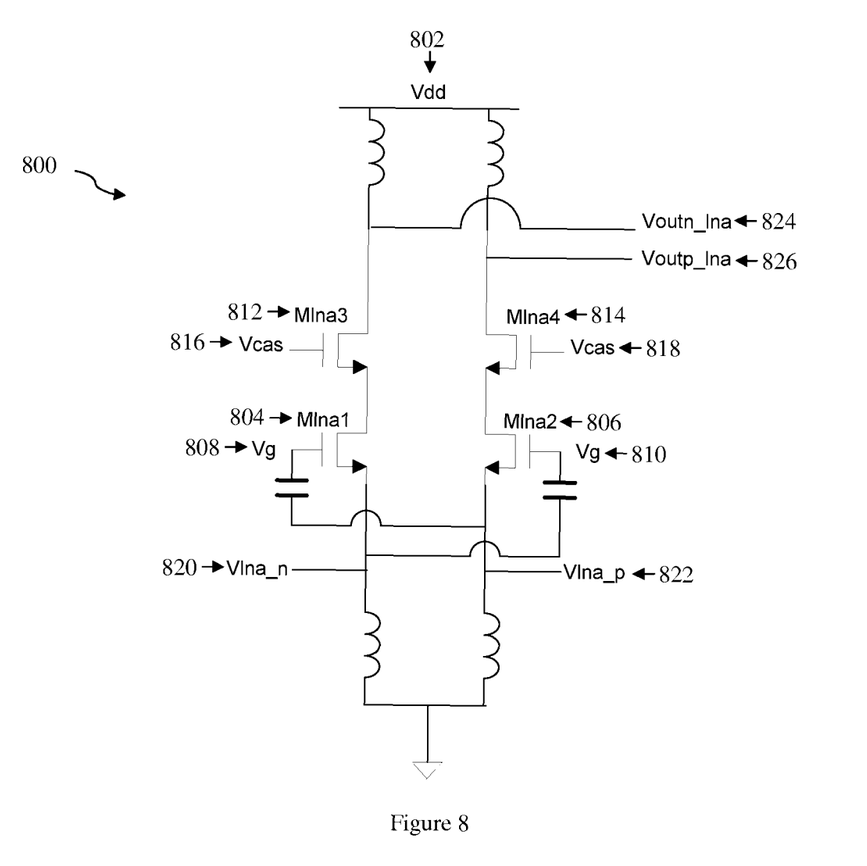
FIG. 8 illustrates a cross-coupled common-gate LNA in accordance with an embodiment.

One of ordinary skill in the art readily recognizes that other implementations of a LNA that includes a similar optimal impedance to a PA may be utilized and that would be within the spirit and scope of the present invention. FIG. 8 illustrates another implementation of the LNA as a cross-coupled common-gate LNA 800 that includes an IC power supply pin Vdd 802, input devices MIna1 804 and MIna2 806, voltages Vg 808 and Vg 810 corresponding to the input devices MIna1 804 and MIna2 806, cascode devices MIna3 812 and MIna4 814, voltages Vcas 816 and Vcas 818 corresponding to the cascode devices MIna3 812 and MIna 814, input signals VIna_n 820 and VIna_p 822, and differential output signals Voutn_Ina 824 and Voutp_Ina 826.

In the cross-coupled gate LNA 800, the IC power supply pin Vdd 802 is differentially coupled to the input devices MIna1 804 and MIna2 806 and to the cascode devices MIna3 812 and MIan4 814. In the cross-coupled gate LNA 800, input device MIna1 804 is in series with cascode device MIna3 812 and input device MIna2 806 is in series with cascode device MIna4 814. Furthermore, input device Mal 804 and cascode device MIna3 812 provide differential output signal Voutn_Ina 824 and input device MIna2 806 and cascode device MIna4 814 provide differential output signal Voutp_Ina 826.

In the cross-coupled common-gate LNA 800, the input signal VIna_p 822 is fed to the gate of MIna1 804 and the source of MIna2 806 and the input signal VIna_n 820 is fed to the gate of MIna2 806 and the source of MIna1 804. The cross-coupled common-gate LNA 800 illustrates a differential version of the LNA. In another embodiment, the cross-coupled common-gate LNA 800 can be applied to a single-ended version of the LNA.

In another embodiment, a common source LNA with feedback implementation is utilized. The feedback reduces the optimal input impedance of a common source LNA to a level that is similar to the optimal impedance of the PA.

Figure 9:
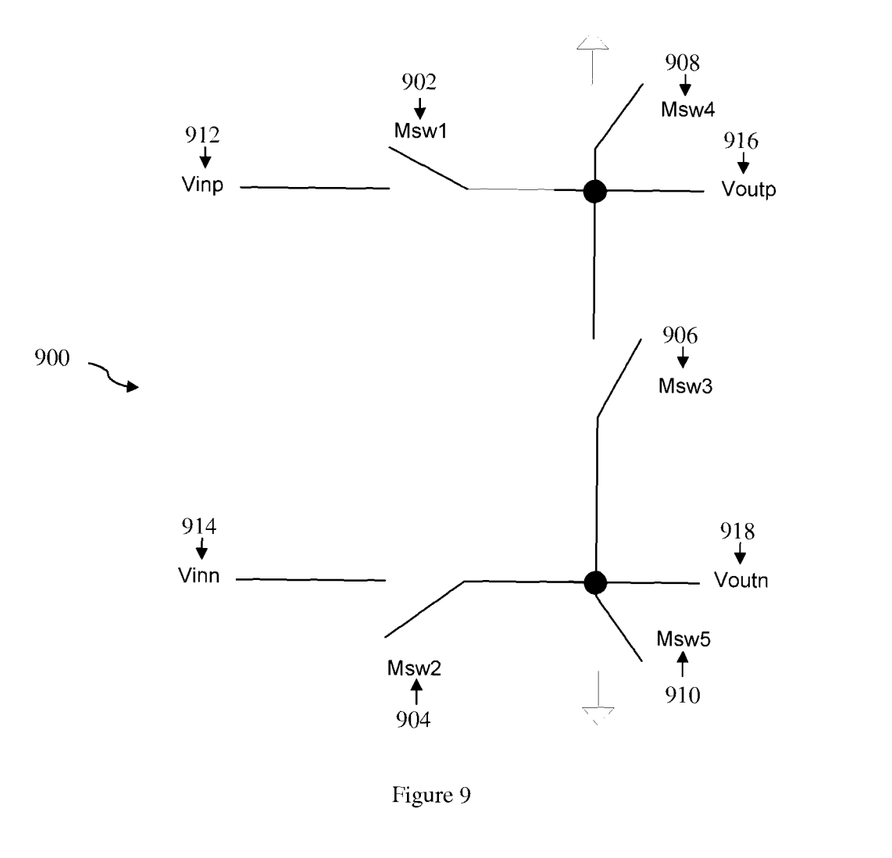
FIG. 9 illustrates an integrated T/R SW in accordance with an embodiment.

One of ordinary skill in the art readily recognizes that the present invention may utilize various implementations of an integrated transmit/receive switch (T/R SW) and that would be within the spirit and scope of the present invention. FIG. 9 illustrates an integrated transmit/receive switch (T/R SW) 900 that includes series transistors Msw1 902 and Msw2 904, shunt transistors Msw3 906, Msw4 908 and Msw5 910, input signals Vinp 912 and Vinn 914 and output signals Voutp 916 and Voutn 918. Shunt transistor Msw3 906 shunts the differential mode signal whereas shunt transistors Msw4 908 and Msw5 910 shunt both the common mode and differential mode signals.

When integrated T/R SW 900 is on, shunt transistors Msw3-5 906-910 are off and series transistors Msw1-2 902-904 are on to allow the input signals Vinp 912 and Vinn 914 to pass through the integrated T/R SW 900 to the output with minimal loss. When integrated T/R SW 900 is off, shunt transistors Msw 1-2 902-904 are off and shunt transistors Msw 3-5 906-910 are all on. The high series impedance and low shunt impedance attenuate the large signal of the PA and isolate the input of the LNA from the output of the PA. The integrated T/R SW 900 illustrates a differential version of the T/R SW. In another embodiment, a single-ended version of the T/R SW can be implemented.

One of ordinary skill in the art readily recognizes that the integrated T/R SW 900 can be implemented in a variety of other ways including but not limited to omitting the shunt transistor Msw3 906, omitting the shunt transistors Msw4 908 and Msw5 910, using a field-effect transistor (FET) or using a transmission gate and that would be within the spirit and scope of the present invention.

As above described, by isolating the TX path from the RX path, integrating the RF front end components on-chip and creating a matching network that is optimized for both the PA and the LNA, the present invention achieves a more robust integrated T/R SW solution. Thus, the cost, size and package pin count of the RF front end system is reduced by the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A Radio Frequency (RF) front end system comprising:
an antenna;
a matching network coupled to the antenna;
a power amplifier (PA) coupled to the matching network via a port on a transmit (TX) path;
a low noise amplifier (LNA) coupled to the matching network via the port on a receive (RX) path; and
at least one transmit/receive switch (T/R SW) coupled between the port and at least one of the PA and LNA, wherein an optimal impedance of the PA is substantially similar to an optimal impedance of the LNA to enable sharing by the PA and LNA of both the same matching network and the same package pin.

2. The RF front end system of claim 1, further comprising: wherein the antenna and the matching network are integrated off-chip and the PA, the LNA and the at least one T/R SW are integrated on-chip.

3. The RF front end system of claim 2, further comprising: wherein the PA and the LNA are combined together at the port.

4. The RF front end system of claim 3, wherein the port is a single RF port.

5. The RF front end system of claim 3, wherein the transmit switch (TX SW) of the at least one transmit/receive switch (T/R SW) is integrated with an output stage of the PA.

6. The RF front end system of claim 5, wherein the output stage of the PA includes a power supply pin Vdd differentially coupled to first and second input devices and to first and second cascode devices, wherein the first input device is in series with the first cascode device and the second input device is in series with the second cascode device, wherein the first input device and first cascode device provide a first differential output signal and the second input device and second cascode device provide a second differential output signal.

7. The RF front end system of claim 6, wherein the first and second input devices are thin oxide devices and the first and second cascode devices are thick oxide devices.

8. The RF front end system of claim 5, wherein the output stage of the PA is single-ended.

9. The RF front end system of claim 3, wherein the LNA is a common-gate LNA.

10. The RF front end system of claim 9, wherein the common-gate LNA includes a power supply pin Vdd differentially coupled to first and second input devices and first and second cascode devices, wherein the first input device is in series with the first cascode device and the second input device is in series with the second cascode device, wherein the first input device and first cascode device provide a first differential output signal and the second input device and second cascode device provide a second differential output signal.

11. The RF front end system of claim 10, wherein an input impedance of the common-gate LNA is inversely proportional to a transconductance of the first and second input devices.

12. The RF front end system of claim 11, wherein the input impedance is a common RF port impedance.

13. The RF front end system of claim 9, wherein the common-gate LNA is single-ended.

14. The RF front end system of claim 3, wherein the LNA is a cross-coupled common-gate LNA.

15. The RF front end system of claim 3, wherein the LNA is a common source LNA with feedback implementation.

16. The RF front end system of claim 3, wherein the at least one T/R SW includes first and second series transistors, first, second and third shunt transistors, first and second input signals, and first and second output signals.

17. The RF front end system of claim 3, wherein the at least one T/R SW is single-ended.

18. The RF front end system of claim 3, wherein the at least one T/R SW is implemented using a field-effect transistor (FET) or a transmission gate.

19. The RF front end system of claim 1, wherein the at least one T/R SW is a plurality of transmit-receive switches.

20. A method for creating a Radio Frequency (RF) front end, the method comprising:
coupling a matching network to an antenna, coupling a power amplifier (PA) to the matching network via a port on a transmit (TX) path;
coupling a low noise amplifier (LNA) to the matching network via the port on a receive (RX) path;
coupling at least one transmit/receive switch (T/R SW) between the port and at least one of the PA and LNA;
integrating the antenna and the matching network off-chip;
integrating the PA, the LNA and the at least one T/R SW on-chip; and combining the PA and the LNA together at the port, wherein the size and package pin count of the RF front end is reduced, wherein an optimal impedance of the PA is substantially similar to an optimal impedance of the LNA to enable sharing by the PA and LNA of both the same matching network and the same package pin.

21. A Radio Frequency (RF) front end system comprising:
an antenna;
a matching network coupled to the antenna;
a power amplifier (PA) coupled to the matching network via a port on a transmit (TX) path;
a low noise amplifier (LNA) coupled to the matching network via the port on a receive (RX) path; and
at least one transmit/receive switch (T/R SW) coupled between the port and at least one of the PA and LNA, wherein an optimal impedance of the PA is substantially similar to an optimal impedance of the LNA to enable sharing by the PA and LNA of both the same matching network and the same package pin, wherein the matching network is shared by the PA and the LNA in a transmitting mode and a receiving mode respectively without using an additional impedance matching circuit.

* * * * *